(12) United States Patent
Aihara (10) Patent No.: US 11,155,026 B2
(45) Date of Patent: Oct. 26, 2021

(54) FILM PASTING TOOL AND FILM PASTING METHOD

(71) Applicant: TOYOTA JIDOSHA KABUSHIKI KAISHA, Toyota (JP)

(72) Inventor: Shinya Aihara, Motosu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 127 days.

(21) Appl. No.: 16/209,278

(22) Filed: Dec. 4, 2018

(65) Prior Publication Data

US 2019/0168442 A1 Jun. 6, 2019

(30) Foreign Application Priority Data

Dec. 5, 2017 (JP) ............................. JP2017-233482

(51) Int. Cl.
*B29C 65/00* (2006.01)
*B29C 63/02* (2006.01)
(Continued)

(52) U.S. Cl.
CPC .......... *B29C 63/02* (2013.01); *B25B 27/0092* (2013.01); *B29C 63/0004* (2013.01); *B44C 1/105* (2013.01); *B60J 3/00* (2013.01); *C03C 17/00* (2013.01); *B29C 65/4825* (2013.01); *B29C 65/5007* (2013.01); *B29C 65/5071* (2013.01); *B29C 65/76* (2013.01); *B29C 65/7805* (2013.01); *B29C 65/7814* (2013.01);
(Continued)

(58) Field of Classification Search
CPC ............ B29C 65/4825; B29C 65/5007; B29C 65/5071; B29C 65/76; B29C 65/7805; B29C 65/7814; B29C 65/7817; B29C 66/005; B29C 66/43; B29C 66/47; B29C 66/472

See application file for complete search history.

(56) References Cited

U.S. PATENT DOCUMENTS 2,153,310 A * 4/1939 Newman .................. G09F 3/02
24/17 R
5,582,889 A * 12/1996 Pedrini ..................... G09F 3/02
428/41.9
(Continued)

FOREIGN PATENT DOCUMENTS

WO 2015/037054 A1 3/2015
WO 2016/129699 A1 8/2016

*Primary Examiner* — Mark A Osele
*Assistant Examiner* — Nickolas R Harm
(74) *Attorney, Agent, or Firm* — Sughrue Mion, PLLC (57) ABSTRACT

A film pasting tool is used to paste one surface of a film on a member-to-be-pasted at a predetermined position. The tool comprises a flexible tabular body, a first adhesive part, a front surface thereof being adhesive, provided on one surface of the body, and a second adhesive part, a front surface thereof being adhesive, provided on a part of a region other than a region where the first adhesive part is provided out of one surface of the body. An other surface of the film is pastable on the front surface of the second adhesive part, and when the other surface of the film is pasted on the front surface of the second adhesive part, the front surface of the first adhesive part is exposed in such a manner that the front surface of the first adhesive part is pastable on the member-to-be-pasted.

10 Claims, 8 Drawing Sheets

(51) Int. Cl.
    *B29C 63/00*     (2006.01)
    *C03C 17/00*     (2006.01)
    *B60J 3/00*     (2006.01)
    *B25B 27/00*     (2006.01)
    *B44C 1/10*     (2006.01)
    B29L 31/34     (2006.01)
    B29C 65/76     (2006.01)
    B29C 65/48     (2006.01)
    B29C 65/78     (2006.01)
    B29C 65/50     (2006.01)

(52) U.S. Cl.
    CPC ........ *B29C 65/7817* (2013.01); *B29C 66/005* (2013.01); *B29C 66/43* (2013.01); *B29C 66/47* (2013.01); *B29C 66/472* (2013.01); *B29C 2063/0008* (2013.01); *B29C 2063/027* (2013.01); *B29L 2031/3437* (2013.01)

(56) References Cited

U.S. PATENT DOCUMENTS

| | | | | |
|---|---|---|---|---|
| 5,824,380 | A * | 10/1998 | Hagen | B32B 3/04 |
| | | | | 428/41.9 |
| 5,855,434 | A * | 1/1999 | Hagen | B65D 33/1691 |
| | | | | 383/203 |
| 5,972,455 | A * | 10/1999 | Barry | G09F 3/0289 |
| | | | | 428/40.1 |
| 6,113,271 | A * | 9/2000 | Scott | B65D 75/5838 |
| | | | | 206/494 |
| 6,120,867 | A * | 9/2000 | Hamerski | C09J 7/22 |
| | | | | 428/40.1 |
| 6,517,243 | B2 * | 2/2003 | Huffer | B65D 33/20 |
| | | | | 383/88 |
| 9,395,038 | B2 * | 7/2016 | Crosby | C09J 7/21 |

\* cited by examiner

FILM PASTING TOOL AND FILM PASTING METHOD

TECHNICAL FIELD

The present invention relates to a film pasting tool for pasting a film on a member-to-be-pasted and a film pasting method for pasting the film on the member-to-be-pasted.

BACKGROUND ART

It has been conventionally conducted to paste a film with various properties on a member such as glass, a liquid crystal display, or the like. For example, WO2016/129699 discloses a technique to paste a film with anti-fog property (hereinafter, referred to as an "anti-fog film") on a window glass of a vehicle so as to suppress a region where the anti-fog film has been pasted from fogging due to a difference in temperature between an inside and an outside of the vehicle. Hereinafter, a member on which the film is pasted will be referred to as a "member-to-be-pasted".

SUMMARY OF THE INVENTION

This type of film is pasted on a member-to-be-pasted typically in a following order. That is, first, position the film by pasting a part of the film on the member-to-be-pasted at a predetermined position, holding the film in such a manner that an adhesive surface of the film does not adhere to a hand. Next, press a squeegee to a part of the film which has not yet been pasted to the member-to-be-pasted (Hereinafter, this part will be referred to as a "unpasted part".), holding the film in such a manner that the unpasted part of the film unintentionally adheres to the member-to-be-pasted (in other words, adheres to a part other than the predetermined position), and moves the squeegee in a fixed direction to paste the film on the member-to-be-pasted.

The use of the squeegee provides uniform pressure on the film and therefore pasting the film by moving the squeegee in the fixed direction enables to suppress occurrence of air bubble between the film and the member-to-be-pasted. Hereinafter, the occurrence of air bubble between the film and the member-to-be-pasted will be simply expressed as "the occurrence of air bubble underneath the film" or "the occurrence of air bubble".

It has been generally known that air bubble is easy to occur underneath a part of the film to which the squeegee is first pressed. Thus, although the aforementioned method makes it possible to suppress the occurrence of air bubble underneath a part of the film which is pasted on the member-to-be-pasted by using the squeegee, air bubble may occur underneath a part of the film to which the squeegee is first pressed. In addition, since the squeegee is not used for a part of the film which is first pasted on the member-to-be-pasted (that is, a part of the film which is pasted for a purpose of positioning of the film), air bubble may occur underneath this part as well. For some films, depending on materials thereof, once air bubble occurs, it is difficult to release air bubble from underneath the film even with an aid of the squeegee. When pasting the film by the above method in such a case, the occurrence of air bubble between the film and the member-to-be-pasted is inevitable.

In addition, in the method above, the film is positioned by pasting a part of the film on the member-to-be-pasted. That is, a positioning work and a pasting work are performed at a same time. Therefore, the positioning work needs to be done, paying attention to the pasting work so as not to fail in the pasting work, which may decrease a work efficiency. Here, to be more specific, "failing in the pasting work" means forming air bubble underneath the film when positioning the film, making the adhesive surface of the film dirty by a worker's hand touching this adhesive surface, and so on.

The present invention is made to resolve the problem above. That is, one of objects of the present invention is to provide a film pasting tool and a film pasting method capable of suppressing the occurrence of air bubble underneath a film when pasting the film on a member-to-be-pasted as well as improving a work efficiency.

A film pasting tool (10) according to the present invention is used to paste one surface (24a) of a film (24) on a member-to-be-pasted (30) at a predetermined position.

This film pasting tool (10) comprises;

a flexible tabular body (12);

a first adhesive part (14), a front surface (14a) thereof being adhesive, provided on one surface (13a) of the body (12); and a second adhesive part (20), a front surface (20a) thereof being adhesive, provided on a part of a region other than a region where the first adhesive part (14) is provided out of the one surface (13a) of the body (12), wherein, an other surface (24b) of the film (24) is pastable on the front surface (20a) of the second adhesive part (20), and when the other surface (24b) of the film (24) is pasted on the front surface (20a) of the second adhesive part (20), the front surface (14a) of the first adhesive part (14) is exposed in such a manner that the front surface (14a) of the first adhesive part (14) is pastable on the member-to-be-pasted (30).

According to the film pasting tool (hereinafter, may be also simply referred to as a "tool") of the present invention, the other surface of the film is pastable on the front surface of the second adhesive part, and when the other surface of the film is pasted on this surface, the front surface of the first adhesive part is exposed in such a manner that the front surface of the first adhesive part is pastable on the member-to-be-pasted. This enables to paste the front surface of the first adhesive part on the member-to-be-pasted after pasting the other surface of the film on the front surface of the second adhesive part. Thereby, the tool on which the film has been pasted can be fixed to the member-to-be-pasted at the first adhesive part. The film is fixed to the tool at the second adhesive part. Thus, according to this configuration, the film can be positioned with respect to the member-to-be-pasted (in other words, a position of the film which is to be pasted on the member-to-be-pasted can be uniquely determined.). Accordingly, different from a conventional method, it becomes unnecessary to position the film by pasting a part of the film on the member-to-be-pasted. As a result, a position at which the squeegee is first pressed can be set to the outside of the film, not on the film, which enables to paste the film on the member-to-be-pasted from an edge thereof with the squeegee. Thereby, a possibility of the occurrence of air bubble underneath the film can be significantly reduced. In addition, the positioning work of the film (that is, the work of pasting the front surface of the first adhesive part on the member-to-be-pasted) and the pasting work of the film (that is, the work of pasting one surface of the film on the member-to-be-pasted) can be done separately, and thus it becomes unnecessary to do the positioning work, paying attention to the pasting work so as not to fail in the pasting work, resulting in improvement of the work efficiency.

In another aspect of the film pasting tool (10) of the present invention, the front surface (20a) of the second adhesive part (20) has a lower adhesive strength than the front surface (14a) of the first adhesive part (14).

The first adhesive part plays a role of fixing the tool to the member-to-be-pasted by the front surface of the first adhesive part being pasted on the member-to-be-pasted. Thus, the front surface of the first adhesive part needs adhesive strength to such an extent that the tool does not come off the member-to-be-pasted due to external force acting on the tool. On the other hand, the second adhesive part plays a role of fixing the film to the body by the film being pasted on the front surface of the second adhesive part. The film is relatively light, and it is very less likely that some external forces other than gravity will act on the film when pasting the film with the tool. Therefore, adhesive strength of the front surface of the second adhesive part is enough to such an extent that the film can be temporarily fixed to the body (that is, until the film is pasted on the member-to-be-pasted). Thus, according to the above configuration, it becomes possible to properly fix the film to the body until the film is pasted on the member-to-be-pasted as well as to easily peel the second adhesive part from the film after the film has been pasted. As a result, the work efficiency is improved.

Another aspect of the film pasting tool (10) of the present invention further comprising the film (24), wherein, an other surface (24b) of the film (24) has been pasted on the front surface (20a) of the second adhesive part (20).

According to this configuration, work of pasting the film on the front surface of the second adhesive part can be skipped, and thus the work efficiency can be improved by that amount of work.

In this case, an outer contour of the film (24) is smaller than an outer contour of the body (12).

According to this configuration, force by the squeegee can be applied on the entire film via the body, and thus uniform force can be applied on the entire film, which can further reduce the possibility that air bubble occurs underneath the film.

In another aspect of the film pasting tool (10) of the present invention, the body (12) includes a grip part (12a2) to be gripped by a worker when doing a pasting work, and the first adhesive part (14) and the second adhesive part (20) are not provided on one surface (13a) of the grip part (12a2).

This configuration enables the worker to do the pasting work of the film, holding the grip part on which the first adhesive part and the second adhesive part are not provided. Thus, a possibility that the worker's hand accidentally touches the adhesive surface of the film can be further reduced compared to a configuration where the worker does the pasting work of the film, holding the body other than the grip part.

In this case, a length from the grip part (12a2) to the second adhesive part (20) is shorter than a length from the grip part (12a2) to the first adhesive part (14).

When pasting the film on the member-to-be-pasted, it is required to prevent the adhesive surface of the film from unintentionally adhering to a part of the member-to-be-pasted, the part being a part other than a predetermined position. The tool is fixed to the member-to-be-pasted only at the first adhesive part. Thus, when the tool body includes the grip part at a position satisfying the above configuration (positional relationship), lifting this grip part makes the second adhesive part depart from the member-to-be-pasted. Therefore, it can be properly prevented that the adhesive surface of the film which is pasted on the second adhesive part unintentionally adheres to a part of the member-to-be-pasted, the part being a part other than the predetermined position.

In another aspect of the film pasting tool (10) of the present invention, the body (12) includes at least one claw part (12b) configured to be engaged with a corresponding engaged part (32) fixed in advance on the member-to-be-pasted (30) so that the film pasting tool (10) is positioned with respect to the member-to-be-pasted (30).

According to this configuration, the tool can be properly positioned with respect to the member-to-be-pasted with an aid of the at least one claw part. Thus, the first adhesive part can be properly pasted on the member-to-be-pasted at the predetermined position (a first position), and as a result, the film can be properly pasted on the member-to-be-pasted at the predetermined position.

In another aspect of the film pasting tool (10) of the present invention, the film (24) is larger than the second adhesive part (20), and the one surface (13a) of the body (12) includes at least one positioning line (28) for positioning the film (24) with respect to the body (12).

When the tool does not comprise the film, the positioning line on one surface of the body (that is, a surface on which the film is to be pasted) enables the worker to paste the film on the tool body at a proper position by referring to this positioning line.

On the other hand, when the tool comprises the film, the film can be pasted on the body at a proper position by referring to the positioning line when manufacturing the tool.

In another aspect of the film pasting tool (10) of the present invention, the body (12) is transparent, the film (24) is larger than the second adhesive part (20), and the other surface (13b) of the body (12) includes at least one positioning line (28) for positioning the film (24) with respect to the body (12).

According to this configuration, since the body is transparent, the positioning line can be recognized from one surface of the body even when the positioning line lies on the other surface of the body (that is, a surface at an opposite side of a surface on which the film is to be pasted). Therefore, the film can be pasted on the tool body at a proper position by referring to the positioning line in both cases where the tool does not comprise the film and the tool comprises the film.

In addition, in a film pasting method according to the present invention, a surface (24a) of the film (24), the surface (24a) being positioned at an opposite side of the surface (24b) which has been pasted on the front surface (20a) of the second adhesive part (20) is pasted on a member-to-be-pasted (30) at a predetermined position, using a film pasting tool (10) comprising a flexible tabular body (12); a first adhesive part (14), a front surface (14a) thereof being adhesive, provided on one surface (13a) of the body (12); a second adhesive part (20), a front surface (20a) thereof being adhesive, provided on a part of a region other than a region where the first adhesive part (14) is provided out of the one surface (13a) of the body (12); and a film (24) pasted on the front surface (20a) of the second adhesive part (20).

Specifically, this film pasting method comprises;

a first adhesive part pasting step for pasting the front surface (14a) of the first adhesive part (14) on the member-to-be-pasted (30) at a predetermined first position;

a film preparing step for lifting, after the first adhesive part pasting step, the body (12) in a direction departing from the member-to-be-pasted (30) by holding a part (12a2) of the body (12) where the first adhesive part (14) and the second adhesive part (20) are not provided, the part (12a2) being positioned at a second direction (d2) side of the body (12), the second direction (d2) being opposite to a first direction (d1) toward which the first adhesive part (14) is positioned with respect to the second adhesive part (20), and putting the surface (24a) of the film (24) into an adherable state;

a film pasting step for pressing, after the film preparing step, a squeegee (40) on a part out of an other surface (13b) of the body (12), the part being positioned at the first direction (d1) side of a part corresponding to the film (24) with the body (12) held in such a manner that the surface (24a) of the film (24) is not adhered to the member-to-be-pasted (30) and moving the squeegee (40) in the second direction (d2), applying to the squeegee (40) external force toward the member-to-be-pasted (30) so as to paste, via the body (12), the surface (24a) of the film (24) on the member-to-be-pasted (30) at the predetermined position; and an adhesive part peeling step for peeling, after the film pasting step, the second adhesive part (20) from the film (24) and peeling the first adhesive part (14) from the member-to-be-pasted (30) by bending the body (12).

In the above description, references used in the following descriptions regarding embodiments are added with parentheses to the elements of the present invention, in order to assist in understanding the present invention. However, those references should not be used to limit the scope of the invention.

DESCRIPTION OF THE EMBODIMENT

A film pasting tool and a film pasting method according to an embodiment of the present invention will be described, referring to the figures. The film pasting tool of the present embodiment is used when pasting an anti-fog film with anti-fog property on a front window of a vehicle at a predetermined position. In more detail, the film pasting tool is used when exchanging the anti-fog film which has been already pasted on the front window for a new anti-fog film at a dealer, a repair shop, and the like. It should be noted that a scale of the figures in the present embodiment may be different from an actual scale in order to clearly illustrate a configuration of each member.

[Film Pasting Tool]

Figure 1A:
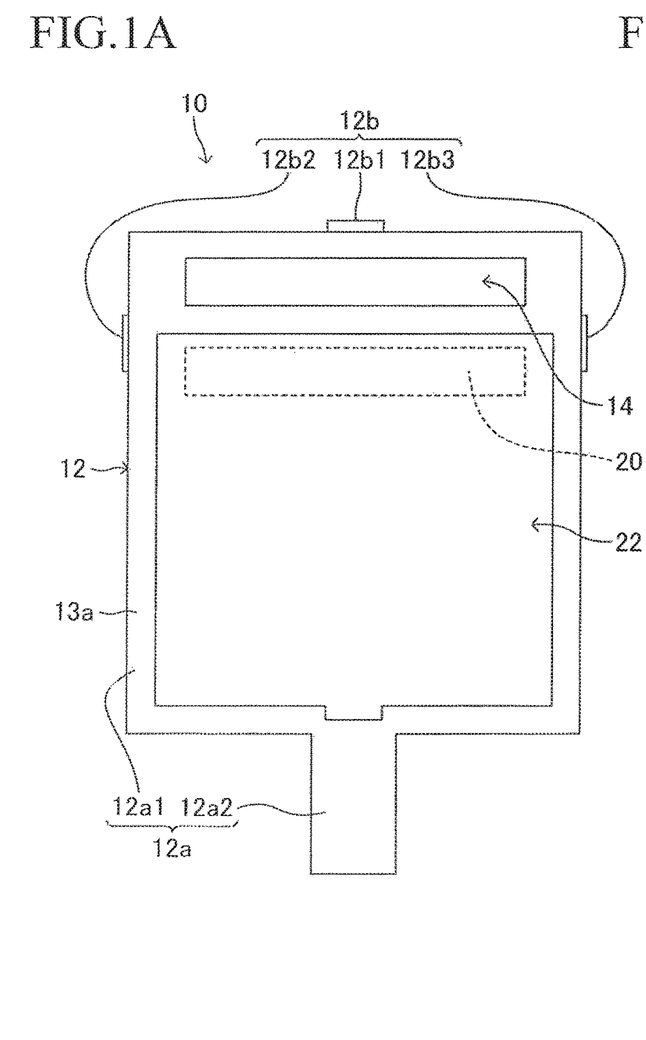
FIG. 1A is a plan view of a film pasting tool (hereinafter, also referred to as a "present embodiment tool") according to an embodiment of the present invention.
Figure 1B:
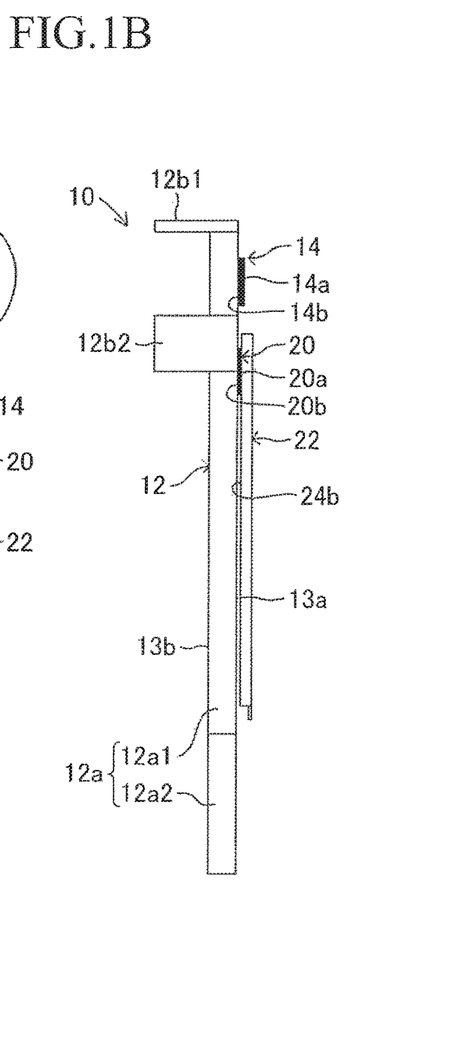
FIG. 1B is a side view of the present embodiment tool.
Figure 1C:
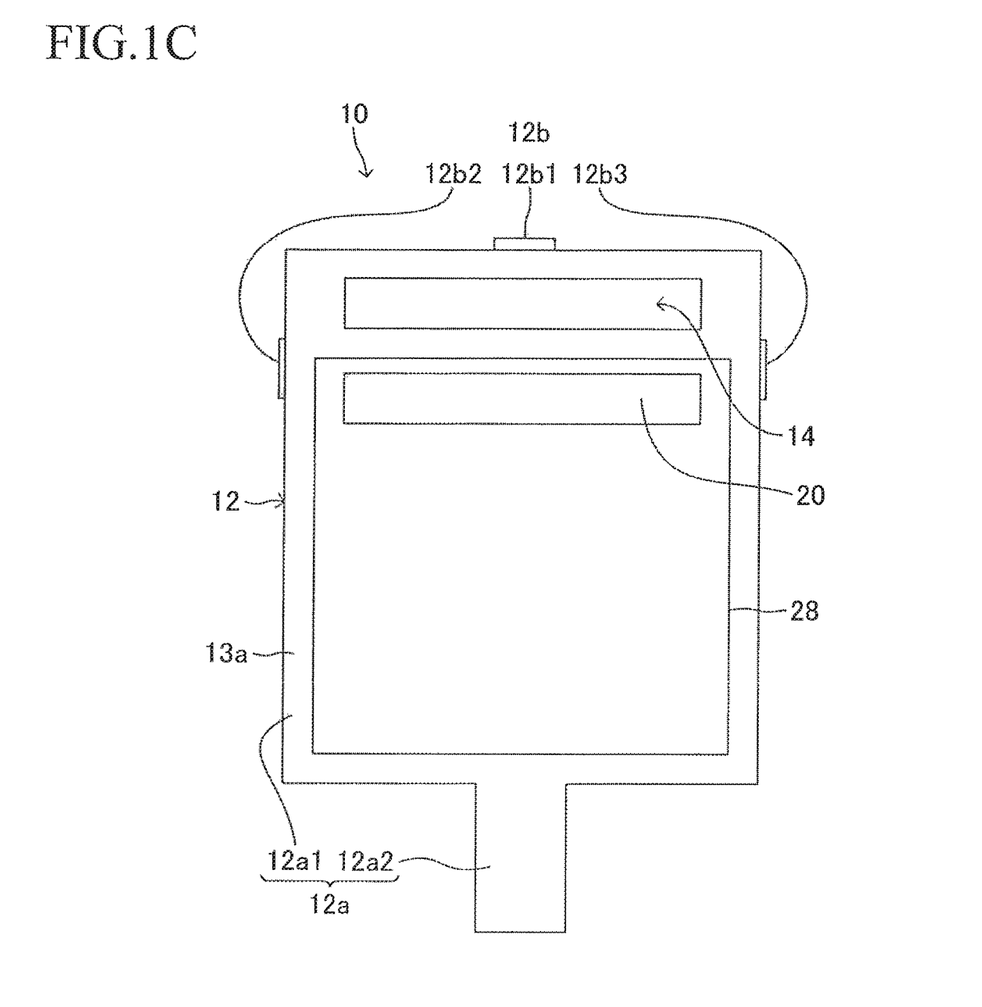
FIG. 1C is a plan view of the present embodiment tool under a state where a film part is removed from the present embodiment tool.

First, a description on a film pasting tool 10 will be made, referring to FIG. 1A to FIG. 4. FIG. 1A shows a plan view of the film pasting tool 10, FIG. 1B shows a side view of the film pasting tool 10, and FIG. 1C shows a plan view of the film pasting tool 10 under a state where a film part 22 has been removed from the film pasting tool 10. Hereinafter, the film pasting tool 10 may be simply referred to as a "tool 10".

As shown in FIG. 1A and FIG. 1B, the tool 10 comprises a body 12, a strong adhesive tape 14, a weak adhesive tape 20, and the film part 22.

As shown in FIG. 1A to FIG. 1C, the body 12 is transparent and includes a tabular part 12a with a tabular shape and three claw parts 12b (12b1, 12b2, 12b3), each of which being integrally formed with the tabular part 12a. The tabular part 12a includes a base part 12a1 with a rectangular shape and a grip part 12a2 with a rectangular shape protruding from one side of the base part 12a1

The strong adhesive tape 14 and the weak adhesive tape 20 are provided on a part of one surface 13a of the tabular part 12a, the part corresponding to the base part 12a1 (Hereinafter, this part will be simply referred to as a "surface 13a of the base part 12a1".), which will be described in detail later. Besides, a frame 28 with a rectangular shape is printed on the surface 13a of the base part 12a1, the frame surrounding the weak adhesive tape 20 (refer to FIG. 1C. described later). Hereinafter, a part of an other surface 13b of the tabular part 12a, the part corresponding to the base part 12a1 will be simply referred to as a "surface 13b of the base part 12a1".

The grip part 12a2 is a part gripped by a worker when a film 24 (described later) of the film part 22 is pasted on a front window 30 (described later). No adhesive tape has been pasted on a part of the one surface 13a of the tabular part 12a, the part corresponding to the grip part 12a2 (Hereinafter, this part will be simply referred to as a "surface 13a of the grip part 12a2".).

The claw parts 12b is provided at, among four sides of the base part 12a1, each of remaining three sides other than one side from which the grip part 12a2 is protruding. The claw part 12b1 is provided at a side opposite to the side from which the grip part 12a2 is protruding, and the claw part 12b2 and the claw part 12b3 are each provided at respective both sides substantially perpendicular to the above side. As shown in FIG. 1B, the claw parts 12b have larger thickness (a length in a left and right direction in FIG. 1B) than the tabular part 12a (the base part 12a1 and the grip part 12a2). The claw parts 12b are protruding from the surface 13b of the base part 12a1 in a "direction from the surface 13a toward the surface 13b (a left direction in FIG. 1B)". As will be described later, a bracket 32 has been fixed to the front window 30 in advance. The claw parts 12b are engageable/configured to be engaged with the bracket 32. By the claw parts 12b being engaged with the bracket 32, the tool 10 is positioned with respect to the front window 30.

A longest part of a lateral width (a length in a left and right direction in FIG. 1A and FIG. 1C) of the body 12 has an approximate length of 10 cm, a longest part of a longitudinal width (a length in a vertical direction in FIG. 1A to FIG. 1C) of the body 12 has an approximate length of 14 cm, and the tabular part 12a (the base part 12a1 and the grip part 12a2) has an approximate thickness of 0.3 mm. The body 12 is flexible to such an extent that the body 12 is slightly bent when the grip part 12a2 is gripped in such a manner that the base part 12a1 becomes horizontal as well as the body 12 is relatively largely bent when force larger than gravity is applied. In the present embodiment, the body 12 is formed by die cutting a resin sheet made from polypropylene. However, other materials yielding a flexibility with a same degree may be used. It should be noted that a size of the body 12 is not limited to the above size, but the size may be properly changed depending on a size of the film 24 and the like.

As shown in FIG. 1A to FIG. 1C, the strong adhesive tape 14 is a double-sided tape with an elongated rectangular shape and includes a front surface 14a and a back surface 14b. The back surface 14b of the strong adhesive tape 14 has been pasted on the surface 13a of the base part 12a1. The strong adhesive tape 14 is arranged in such a manner that a longitudinal direction thereof coincides with a transverse direction in a vicinity of a side among the four sides of the base part 12a1, the side (that is, a side at which the claw part 12b1 is provided) being opposite to a side at which the grip part 12a2 is provided. A non-illustrated release paper has been pasted on the front surface 14a of the strong adhesive tape 14, thereby preventing deterioration in adhesive strength of the front surface 14a due to exposure of the front surface 14a to the air. The release paper is peeled when the tool 10 is used. The front surface 14a of the strong adhesive tape 14 is pasted on the front window 30 at a predetermined position (described later). It should be noted that the strong adhesive tape 14 corresponds to one example of a "first adhesive part".

The weak adhesive tape 20 is a double-sided tape with an elongated rectangular shape and includes a front surface 20a and a back surface 20b. The back surface 20b of the weak adhesive tape 20 has been pasted on a region other than a region where the strong adhesive tape 14 is pasted out of the surface 13a of the base part 12a1. More specifically, the weak adhesive tape 20 is arranged in substantially parallel with the strong adhesive tape 14 on an inner peripheral side of the strong adhesive tape 14 with a predetermined spacing from the strong adhesive tape 14. In other words, a length from the grip part 12a2 to the weak adhesive tape 20 is shorter than a length from the grip part 12a2 to the strong adhesive tape 14. The film part 22 has been pasted in advance on the front surface 20a of the weak adhesive tape 20. Thus, no release paper has been pasted on the front surface 20a. It should be noted that the weak adhesive tape 20 corresponds to one example of a "second adhesive part".

Adhesive strengths of the strong adhesive tape 14 and the weak adhesive tape 20 are preset in such a manner that the adhesive strength of the weak adhesive tape 20 against the film part 22 (strictly, the film 24) is weaker than the adhesive strength of the strong adhesive tape 14 against the front window 30. This will be described in detail later.

Figure 2:
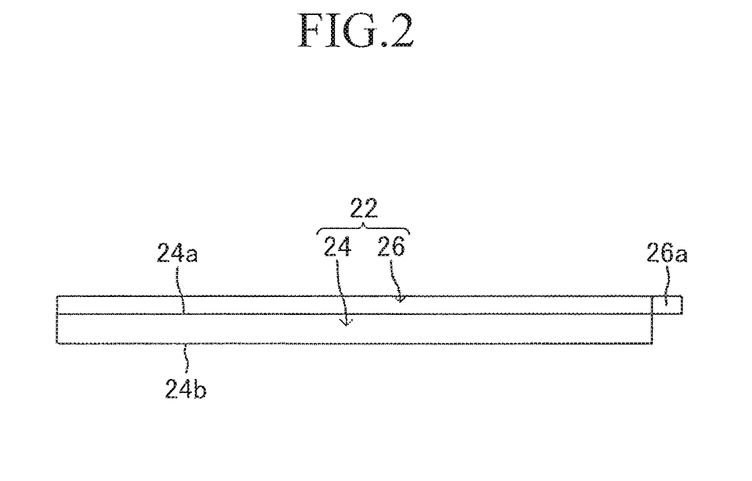
FIG. 2 is a side view of the film part.

As shown in FIG. 1A and FIG. 1B, the film part 22 has a substantially rectangular shape. A size thereof is larger than the weak adhesive tape 20 and smaller than the base part 12a1 of the body 12. The film part 22 is flexible to such an extent that the film part 22 is slightly bent when an edge thereof is held in such a manner that the film part 22 becomes horizontal as well as the film part 22 is relatively largely bent when force larger than gravity is applied. FIG. 2 shows a side view of the film part 22. As shown in FIG. 2, the film part 22 includes the film 24 and a release paper 26. The film 24 is an anti-fog film with anti-fog property. The film 24 has one surface 24a having adhesiveness and an other surface 24b not having adhesiveness. The release paper 26 has been pasted on the surface 24a in such a manner that the release paper 26 covers the entire surface 24a. Thereby, it is prevented that the surface 24 is made dirty or damaged as well as the adhesive strength thereof is deteriorated owing to some foreign object adhering to the surface 24a. The release paper 26 includes a protruding part 26a at an edge thereof. Since the protruding part 26a has not been pasted on the surface 24a, the release paper 26 can be easily peeled without damaging the film 24 by peeling the release paper 26 from the film 24 with the protruding part 26a held. The release paper 26 is peeled off when the tool 10 is used. The surface 24a of the film 24 is pasted on the front window 30 at the predetermined position (described later).

On the other hand, as shown in FIG. 1B, a part of the surface 24b of the film part 22 has been pasted on the front surface 20a of the weak adhesive tape 20. More specifically, as shown in FIG. 1A, an outer contour of the film part 22 is smaller than an outer contour of the base part 12a1, and the film part 22 is arranged in such a manner that four sides thereof are each in substantially parallel with corresponding four sides of the base part 12a1 of the body 12. In addition, the film part 22 is arranged so as to cover most of the region other than the region on which the strong adhesive tape 14 has been pasted out of the surface 13a of the base part 12a1. In other words, the front surface 14a of the strong adhesive tape 14 (strictly, the release paper has been pasted on the surface 14a) is not covered with the film part 22, but is exposed in such a manner that the front surface 14a is pastable on the front window 30.

As mentioned earlier, the frame 28 is printed on the surface 13a of the base part 12a1 of the body 12 (refer to FIG. 1C). The frame 28 has a same size and a same shape as the film 24 of the film part 22 and is used for positioning of the film part 22 when pasting the film part 22 on the weak adhesive tape 20 during manufacturing of the tool 10. Alternatively, the frame 28 is also used for positioning of the film part 22 in a case when the film part 22 is peeled from the weak adhesive tape 20 for some reason and re-pasting is required. It should be noted that the frame 28 corresponds to one example of a "positioning line"

As described above, since the body 12 is transparent, each adhesive tape 14, 20, the film part 22 and the frame 28 can be recognized from the surface 13b of the body 12.

Figure 3A:
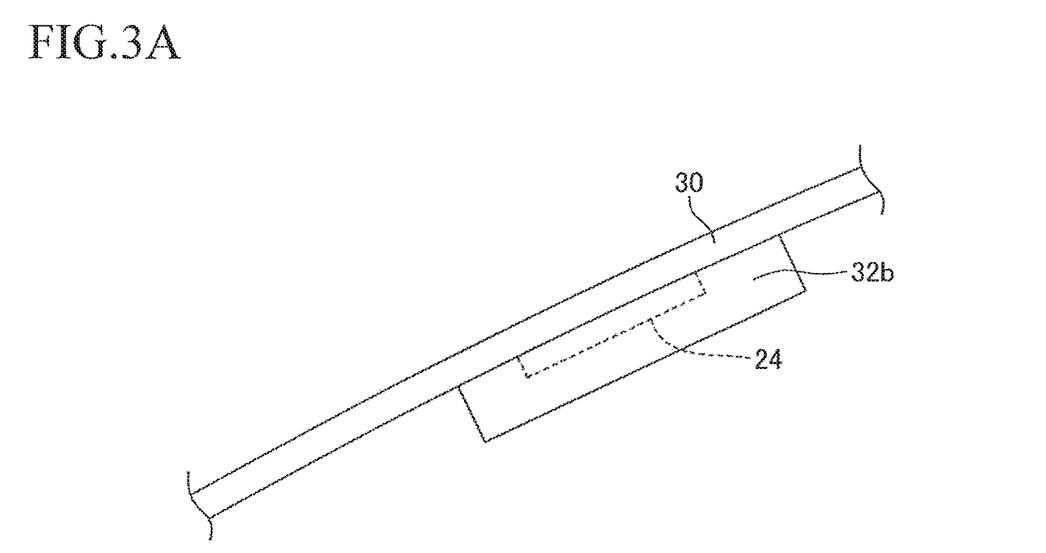
FIG. 3A is a partial side view of an upper part of a front window of a vehicle, showing a positional relationship between a bracket fixed to the front window and a film which has been pasted on the window.
Figure 3B:
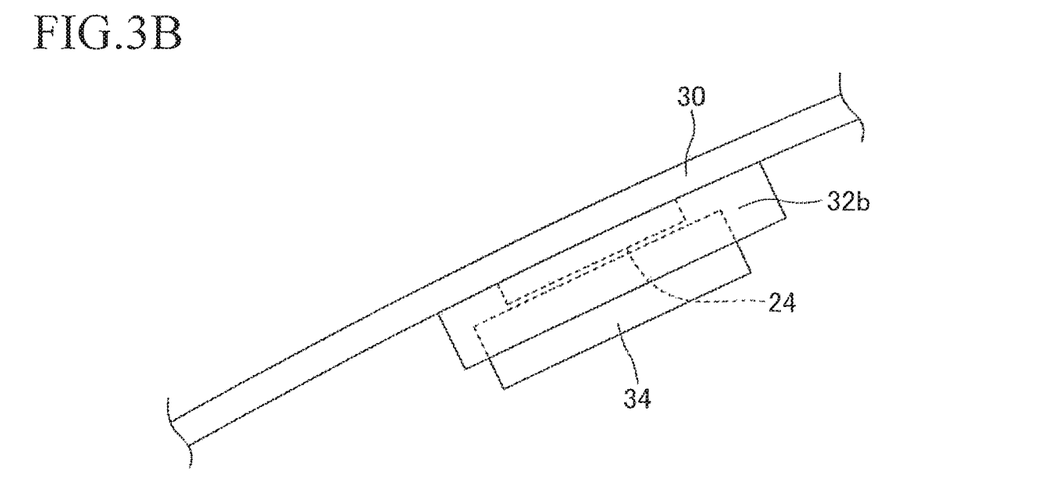
FIG. 3B is a partial side view of the upper part of the front window, showing a positional relationship between a camera sensor arranged at the bracket in FIG. 3A and the film.
Figure 4:
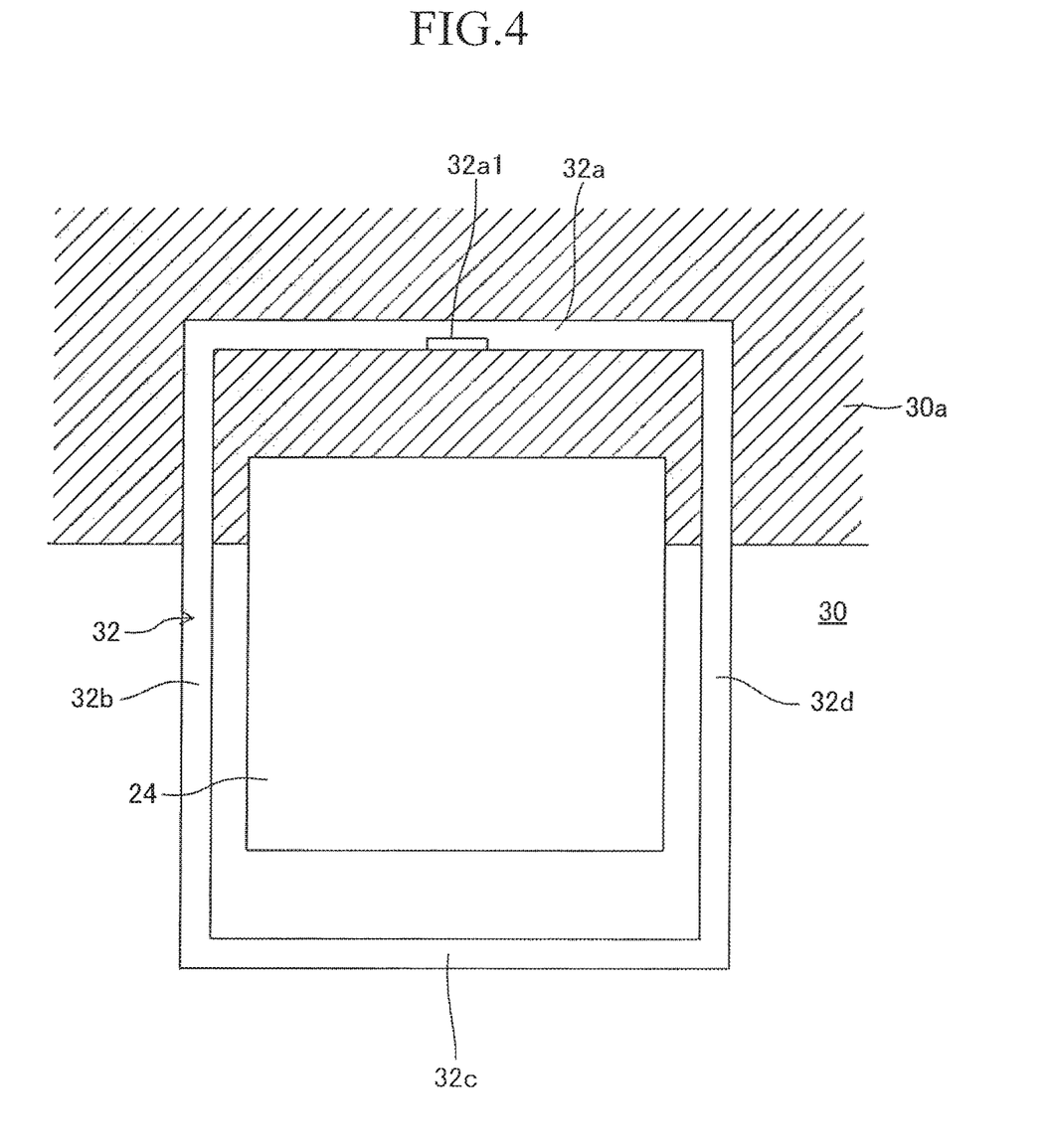
FIG. 4 is a partial plan view of the upper part of the front window when seeing a region corresponding to a region in FIG. 3A from a direction substantially perpendicular to the front window.

FIG. 3A and FIG. 3B are both partial side views of an upper part of the front window 30 (hereinafter, may be simply referred to as a "window 30"). FIG. 3A shows a positional relationship between the window 30, the bracket 32, and the film 24. FIG. 3B shows a positional relationship between a camera sensor 34 and the film 24 in a case when the camera sensor 34 has been placed in the bracket 32. FIG. 4 is a plan view of the upper part of the window 30 of when seeing a region corresponding to a region in FIG. 3A from a direction substantially perpendicular to the window 30.

As shown in FIG. 3A, FIG. 3B, and FIG. 4, the bracket 32 has been fixed in advance to the upper part of a surface of the window 30 on a cabin side. As shown in FIG. 4, the bracket 32 is a cylindrical member with a substantially rectangular shape and is composed of a wall part 32a, a wall part 32b, a wall part 32c, and a wall part 32d. The wall part 32a faces the wall part 32c and is fixed to a more upper part of the window 30 than the wall part 32c. The wall part 32b connects a left end of the wall part 32a and a left end of the wall part 32c in a plan view of the bracket 32 from the cabin. The wall part 32d connects a right end of the wall part 32a and a right end of the wall part 32c in a plan view of the bracket 32 from the cabin. The wall part 32a and upper parts of both of the wall part 32b and the wall part 32d have been fixed to a part of the window 30 on which a ceramic line 30a has been painted.

The bracket 32 plays a role of a base/pedestal used to place the camera sensor 34. The camera sensor 34 is placed in (fixed to) the bracket 32 by engaging non-illustrated engaging parts of the camera sensor 34 with the bracket 32 (refer to FIG. 3B). It should be noted that a non-illustrated room mirror is placed on the bracket 32 as well.

The film 24 has been pasted on a part of the window 30, the part being surrounded by the bracket 32. A groove 32a1 is provided on an inner peripheral surface of the wall part 32a of the bracket 32. Although a detailed description will be made later, the film 24 is pasted on the window 30 by engaging the claw part 12b1 of the tool 10 with the groove 32a1 so as to position the tool 10 with respect to the window 30. Therefore, the bracket 32 also plays a role of an "engaged part" with which the claw part 12b of the tool 10 is engaged. An upper part of the film 24 has been pasted on a part of the window 30 on which the ceramic line 30a has been painted.

It should be noted that the longest part of the lateral width of the body 12 of the tool 10 is substantially equal to a lateral width of the inner peripheral surface of the bracket 32. In addition, the longest part of the longitudinal width of the body 12 of the tool 10 is longer than a longitudinal width of an outer peripheral surface of the bracket 32, and a longitudinal width of the base part 12a1 of the body 12 is shorter than a longitudinal width of the inner peripheral surface of the bracket 32.

The camera sensor 34 is used to acquire information in front of the vehicle (for example, a distance to a preceding vehicle and a speed of the preceding vehicle). The camera sensor 34 faces the film 24 under a state where the camera sensor 34 has been placed in the bracket 32. In more detail, among the camera sensor 34, an irradiation part to irradiate light and a light receiving part to receive light (Illustration are both omitted.) face the film 24.

[Film Pasting Method]

Subsequently, a film pasting method with which the worker pastes the film 24 on the window 30 at a predetermined position using the tool 10 will be described, referring to FIG. 5A to FIG. 7. This film pasting method comprises a strong adhesive tape pasting step, a film preparing step, a film pasting step, and an adhesive tape peeling step. When each of these steps is performed in this order, the film 24 is, as shown FIG. 4, pasted on a part of the window 30, the part being surrounded by the bracket 32. Hereinafter, each of the steps will be described.

(Strong Adhesive Tape Pasting Step)

Figure 5A:
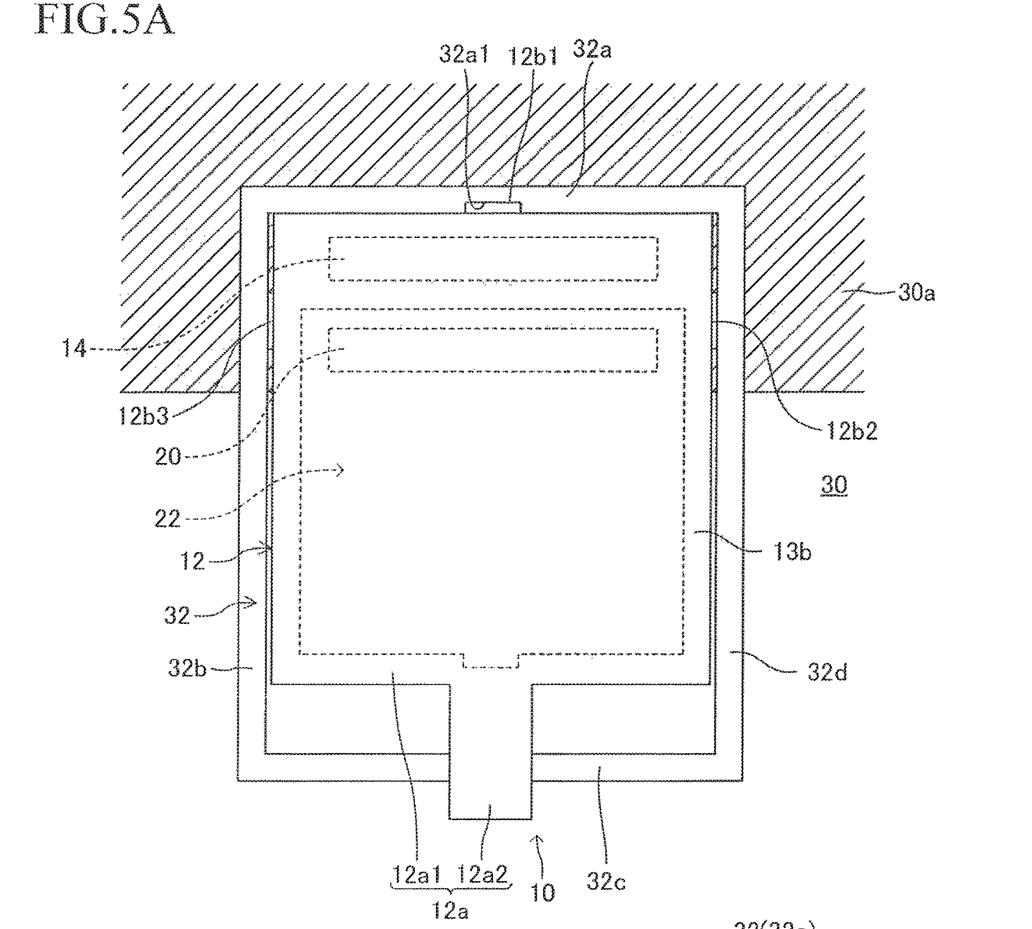
FIG. 5A shows a strong adhesive tape pasting step where the strong adhesive tape has been pasted on the front window under a state where the present embodiment tool is positioned with respect to the bracket (the front window).
Figure 5B:
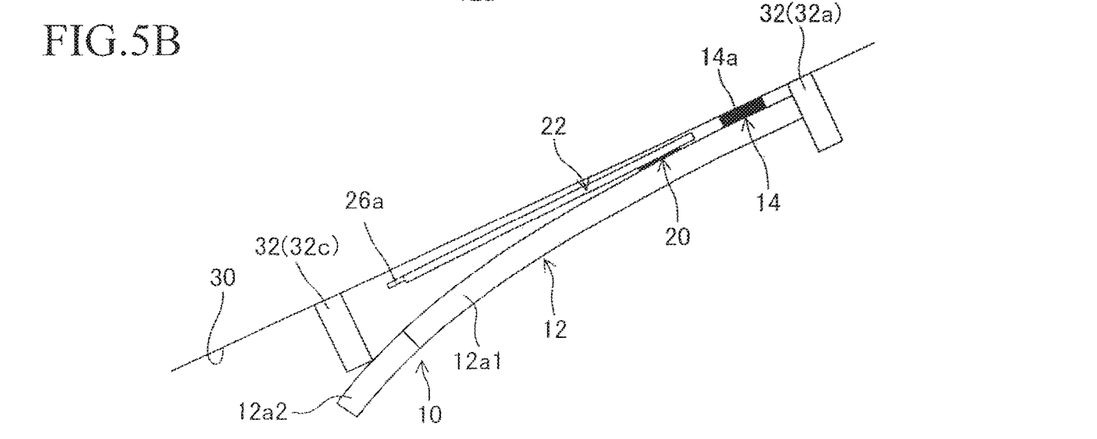
FIG. 5B is a side view of a region corresponding to a region in FIG. 5A.

FIG. 5A and FIG. 5B both show the strong adhesive tape pasting step. FIG. 5A is a plan view of the tool 10 and the bracket 32 seen from a direction substantially perpendicular to the window 30, and FIG. 5B is a side view of the tool 10 and the bracket 32. It should be noted that in FIG. 5B, the illustration of the wall parts 32b and 32d of the bracket 32 is omitted for easier view of an inside of the bracket 32. The same holds for FIG. 6 and FIG. 7 below.

In this step, the tool 10 is fixed to the window 30 by pasting the strong adhesive tape 14 on the window 30 at a predetermined position. Specifically, first, peel off the non-illustrated release paper pasted on the front surface 14a of the strong adhesive tape 14 so as to expose the front surface 14a. Next, engage the claw part 12b1 of the tool 10 with the groove 32a of the bracket 32. The groove 32a is provided at such a position that the claw part 12b2 and the claw part 12b3 make contact with the corresponding inner peripheral surfaces of the wall part 32d and the wall part 32b of the bracket 32 when the claw part 12b1 is engaged with the groove 32a1 and the body 12 of the tool 10 is pressed to a part of the window 30, the part being surrounded by the bracket 32. The claw part 12b2 applies elastic force in a right direction in FIG. 5A on the wall part 32d. The claw part 12b3 applies elastic force in a left direction in FIG. 5A on the wall part 32b. By means of the claw parts 12b1 to 12b3, the tool 10 is positioned with respect to the bracket 32 (that is, with respect to the window 30 to which the bracket 32 is fixed).

The front surface 14a of the strong adhesive tape 14 is pasted on the window 30 by applying force (typically, by the worker pressing with his/her finger) toward the window 30, under a state where the tool 10 is positioned with respect to the bracket 32, on a part corresponding to a part where the strong adhesive tape 14 has been pasted out of the surface 13b (that is, an opposite surface to the surface on which the strong adhesive tape 14 has been pasted) of the base part 12a1 of the tool 10. The strong adhesive tape 14 is pasted on the ceramic line 30a of the window 30 (refer to FIG. 5A). In addition, although the gravity of the tool 10 acts on the strong adhesive tape 14 due to inclination of the window 30, the adhesive strength of the front surface 14a of the strong adhesive tape 14 against the window 30 is designed in advance to such an extent that the strong adhesive tape 14 does not peel from the window 30 due to the gravity.

Through this step, the strong adhesive tape 14 is properly pasted on the window 30 at the predetermined position (This position corresponds to one example of a "first position".). Thereby, the tool 10 is fixed to the window 30. As mentioned earlier, since the longest part of the longitudinal width of the body 12 of the tool 10 is longer than the longitudinal width of the outer peripheral surface of the bracket 32, when the tool 10 is fixed to a part of the window 30 surrounded by the bracket 32, the body 12 of the tool 10 is bent so as to be curled back against the window 30 and thus a part of the grip part 12a2, the part being positioned outside the bracket 32, is placed on a front surface of the wall part 32c of the bracket 32 (refer to FIG. 5B). Accordingly, a gap/clearance is made between the film part 22 and the window 30.

(Film Preparing Step)

Figure 6:
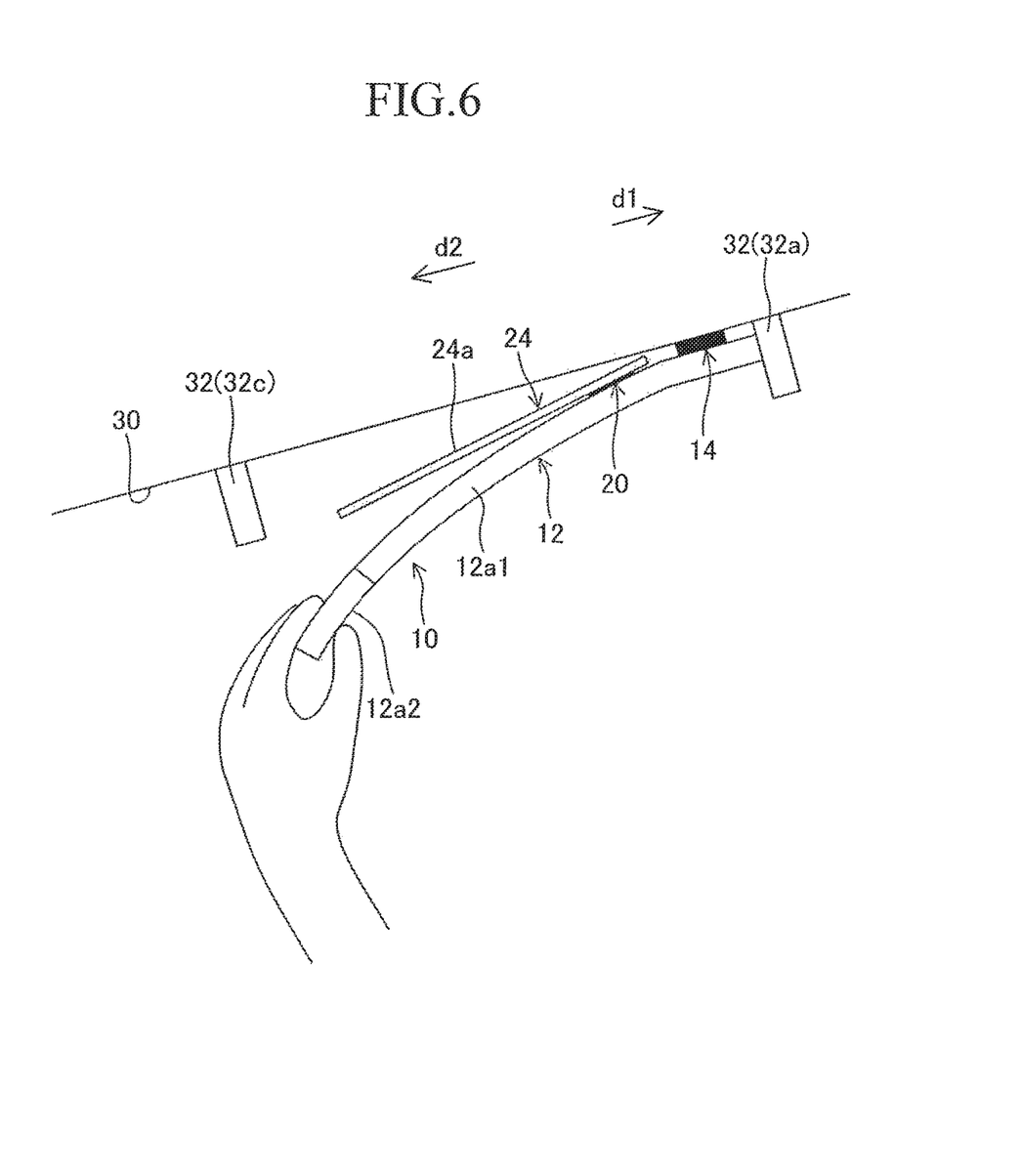
FIG. 6 shows a film preparing step where an adhesive surface of the film is exposed by peeling a release paper of the film part, gripping a grip part of the present embodiment tool with one hand.

FIG. 6 shows the film preparing step. In this step, the film 24 is put into an adherable state (that is, a state where the film 24 is adherable to the window 30) by exposing the surface 24a (a surface having adhesiveness) of the film 24. Specifically, first, lift the grip part 12a2 of the tool 10 in a direction departing from the window 30 by gripping/holding the grip part 12a2 with one hand. When a direction toward which the strong adhesive tape 14 is positioned with respect to the weak adhesive tape 20 is defined as a direction d1, as is obvious from FIG. 6, the grip part 12a2 is positioned on an opposite direction d2 side to the direction d1 with respect to the weak adhesive tape 20. Thus, by lifting the grip part 12a2 in the above direction, the body 12 of the tool 10 is further bent so as to be curled back against the window 30 and the gap/clearance between the film part 22 and the window 30 is made larger. Subsequently, hold the protruding part 26a (refer to FIG. 5B) of the release paper 26 of the film part 22 with an other hand and peel the release paper 26 from the film 24 to expose the surface 24a, which thereby puts the film 24 into the adherable state (that is, makes the film 24 adherable). It should be noted that although the surface 24a of the film 24 is being exposed to the air at this point, since the worker is not gripping the film 24 itself but gripping the grip part 12a2 of the tool 10, a possibility that the worker's hand accidentally touches the surface 24a of the film 24 can be significantly reduced. The direction d1 corresponds to one example of a "first direction" and the direction d2 corresponds to one example of a "second direction".

(Film Pasting Step)

Figure 7:
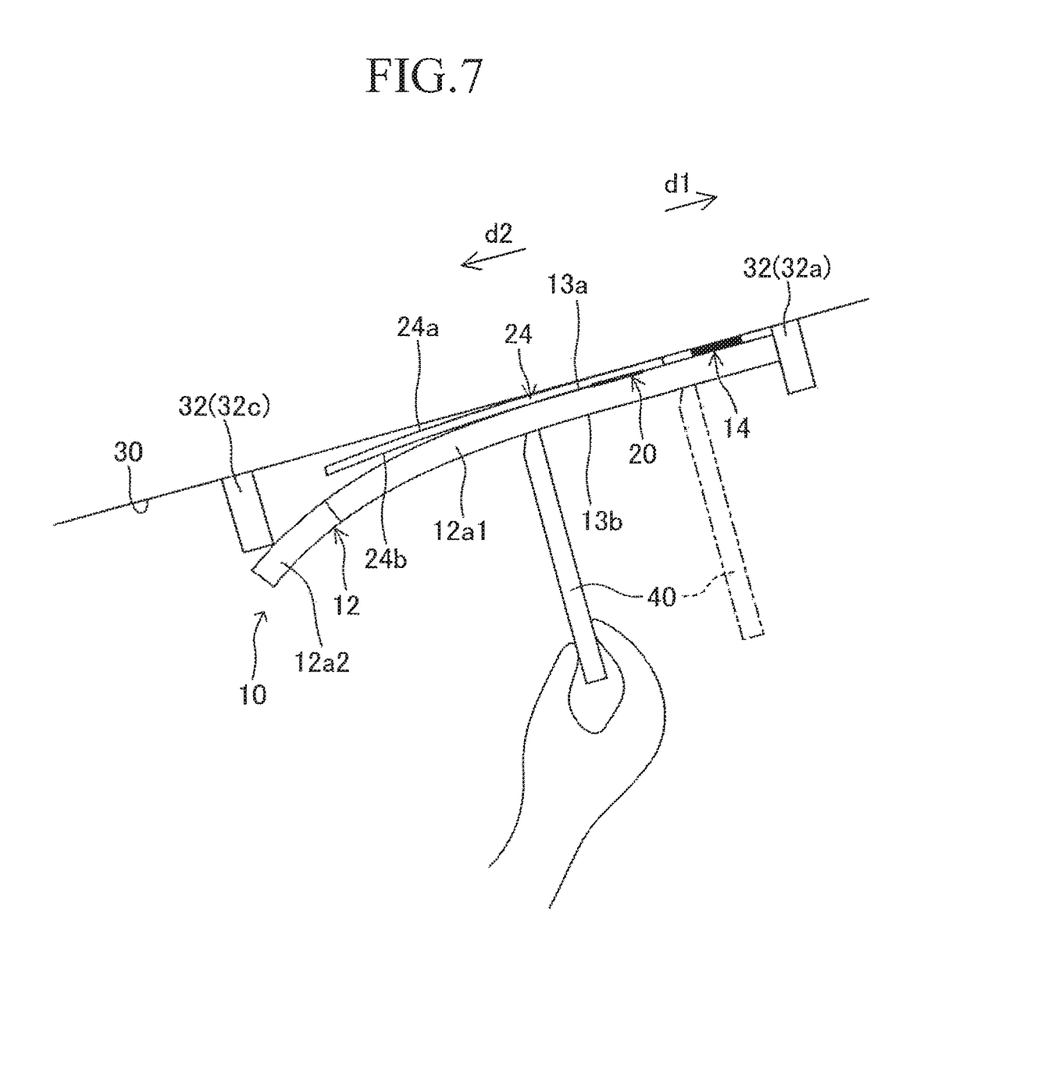
FIG. 7 shows a film pasting step where the film is being pasted on the front window by means of a squeegee.

FIG. 7 shows the film pasting step. In this step, the surface 24a of the film 24 is pasted on the window 30 at the predetermined position. Specifically, first, confirm that the surface 24a of the film 24 is spaced from the window 30 (that is, the surface 24a does not adhere to a part of the window 30 other than the predetermined position), and press a squeegee 40 on a part out of the surface 13b of the base part 12a1 of the body 12, the part being positioned between "a part corresponding to the film 24" and "the part corresponding to the strong adhesive tape 14" (refer to the squeegee 40 shown with a dashed line in FIG. 7). Subsequently, move the squeegee 40 in the direction d2, applying to the squeegee 40 force toward the window 30. In this way, the film 24 is pressed on the window 30 via the body 12 of the tool 10, and the film 24 and the body 12 are bent along a shape of the window 30. Thereby, the surface 24a of the film 24 is pasted on the window 30. The squeegee 40 is moved until the squeegee 40 reaches a position on the direction d2 side of a part out of the surface 13b of the base part 12a1, the part corresponding to the film 24. It should be noted that a lateral width of the squeegee 40 is larger than a lateral width of the film 24 and is smaller than the lateral width of the inner peripheral surface of the bracket 32. Thus, moving the squeegee 40 in the direction d2 just once enables to apply force on the entire film 24 via the body 12 of the tool 10. As mentioned earlier, the tool 10 has been fixed to the window 30 in the strong adhesive tape pasting step. Therefore, through the film pasting step, the surface 24a of the film 24 can be properly pasted on the window 30 at the predetermined position.

As described above, in the present embodiment, the gap/clearance is made between the film part 22 (that is, the film 24) and the window 30 in a state where the grip part 12a2 has been placed on the front surface of the wall part 32c of the bracket 32 (refer to FIG. 5B). Thus, it is less likely that the surface 24a of the film 24 adheres to an unproper position of the window 30 even if the grip part 12a2 is not gripped. Accordingly, it becomes possible for the worker to move the squeegee 40 using both hands in this film pasting step, enabling to apply more uniform force to the film 24.

(Adhesive Tape Peeling Step)

In the adhesive tape peeling step, the tool 10 is detached from the window 30 by peeling the weak adhesive tape 20 from the film 24 and by peeling the strong adhesive tape 14 from the window 30. Specifically, by gripping/holding the grip part 12a2 of the tool 10 and lifting the grip part 12a2 in the direction departing from the window 30, the body 12 of the tool 10 is bent so as to be curled back against the window 30.

Here, a description on adhesive strengths of the weak adhesive tape 20, the strong adhesive tape 14, and the film 24 will be made. The adhesive strength A1 of the weak adhesive tape 20 against the film 24 (the surface 24b) is approximately 3N/25 mm, which is lower than the adhesive strength A2 of the weak adhesive tape 20 against "the base part 12a1 (the surface 13a) of the tool 10". In addition, the adhesive strength A1 is lower than the adhesive strength A3 (approximately 10N/25 mm) of the film 24 (the surface 24a) against the window 30 (that is, A1<A2, A1<A3). Hence, when the grip part 12a2 is lifted as described above, the weak adhesive tape 20 is peeled from the film 24. On the other hand, the adhesive strength A4 of the strong adhesive tape 14 against the window 30 is approximately 8N/25 mm, which is lower than the adhesive strength A5 of the strong adhesive tape 14 against "the base part 12a1 (the surface 13a) of the tool 10" (A4<A5). Hence, when the grip part 12a2 is further lifted, the strong adhesive tape 14 is peeled from the window 30. In this way, the tool 10 is detached from the window 30. As a result, as shown in FIG. 4, only the film 24 is left on the window 30. That is, the film 24 is pasted on the window 30.

Here, as mentioned above, the adhesive strength A1 (approximately 3N/25 mm) of the weak adhesive tape 20 against the film 24 (the surface 24b) is lower than the adhesive strength A4 (approximately 8N/25 mm) of the strong adhesive tape 14 against the window 30 (A1<A4). Thus, the weak adhesive tape 20 can be more easily peeled than the strong adhesive tape 14. It should be noted that these numerical values of the adhesive strengths are merely one example and may be accordingly changed depending on a situation.

According to the tool 10 of the present embodiment, the front surface 14a of the strong adhesive tape 14 is exposed in such a manner that the front surface 14a is pastable on the window 30 under a state where the surface 24b of the film 24 has been pasted on the front surface 20a of the weak adhesive tape 20. Therefore, the front surface 14a of the strong adhesive tape 14 can be pasted on the window 30 and thereby the tool 10 can be fixed to the window 30 at the strong adhesive tape 14. The film 24 is fixed to the tool 10 at the weak adhesive tape 20. Thus, according to this configuration, the film 24 can be positioned with respect to the window 30 (in other words, a position of the film 24 which is to be pasted on the window 30 can be uniquely determined.). Accordingly, different from a conventional method, it becomes unnecessary to position the film 24 by pasting a part of the film 24 on the window 30. As a result, a position at which the squeegee 40 is first pressed can be set to the outside of the film 24, not on the film 24, which enables to paste the film 24 on the window 30 from an edge thereof with the squeegee 40. Thereby, a possibility of the occurrence of air bubble underneath the film 24 can be significantly reduced. This configuration enables the camera sensor 34 to properly irradiate and receive light via a part of the window 30 on which the film 24 has been pasted, and thus the camera sensor 34 can acquire precise information in front of the vehicle. In addition, the positioning work of the film 24 (that is, the work of pasting the front surface 14a of the strong adhesive tape 14 on the window 30) and the pasting work of the film 24 (that is, the work of pasting the surface 24a of the film 24 on the window 30) can be done separately, and thus it becomes unnecessary to do the positioning work, paying attention to the pasting work so as not to fail in the pasting work, resulting in improvement of the work efficiency.

Especially, in the present embodiment, the adhesive strength A1 of the weak adhesive tape 20 against the film 24 is lower than the adhesive strength A4 of the strong adhesive tape 14 against the window 30. Since the strong adhesive tape 14 plays a role of fixing the tool 10 to the window 30, the front surface 14a of the strong adhesive tape 14 needs adhesive strength to such an extent that the tool 10 does not come off the window 30 due to external force acting on the tool 10. On the other hand, the weak adhesive tape 20 plays a role of fixing the film 24 to the tool body 12. The film 24 is relatively light, and it is very less likely that some external forces other than gravity will act on the film 24 when pasting the film 24 with the tool 10. Therefore, adhesive strength of the front surface 20a of the weak adhesive tape 20 is enough to such an extent that the film 24 can be temporarily fixed to the tool body 12 (that is, until the film 24 is pasted on the window 30). Hence, by making the adhesive strength A1 lower than the adhesive strength A4, it becomes possible to properly fix the film 24 to the body 12 until the film 24 is pasted on the window 30 as well as to easily peel the weak adhesive tape 20 from the film 24 after the film 24 has been pasted. As a result, the work efficiency is improved.

Besides, since the tool 10 comprises the film 24 in the present embodiment, the work of pasting the film 24 on the weak adhesive tape 20 of the tool body 12 can be skipped, and thus the work efficiency can be improved by that amount of work.

Further, the outer contour of the film 24 is smaller than the outer contour of the base part 12a1 of the body 12 in the present embodiment. Therefore, force by the squeegee 40 can be applied on the entire film 24 via the base part 12a1, and thus uniform force can be applied on the entire film 24, which can further reduce the possibility that air bubble occurs underneath the film 24.

Further, since the tool body 12 includes the grip part 12a2 in the present embodiment, doing the film pasting work with the grip part 12a2 held enables to reduce the possibility that the worker's hand accidentally touches the adhesive surface 24a of the film 24.

Further, in the present embodiment, the length from the grip part 12a2 of the tool body 12 to the weak adhesive tape 20 is shorter than the length from the grip part 12a2 to the strong adhesive tape 14. The tool 10 is fixed to the window 30 only at the strong adhesive tape 14. Thus, according to this configuration, lifting this grip part 12a2 makes the weak adhesive tape 20 depart from the window 30. Therefore, it can be properly prevented that the surface 24a of the film 24 which is pasted on the weak adhesive tape 20 unintentionally adheres to a part of the window 30, the part being a part other than the predetermined position.

Further, in the present embodiment, the tool body 12 includes the claw parts 12b used to position the tool 10 with respect to the window 30 by engaging the claw parts 12b with the bracket 32 fixed to the window 30 in advance. Therefore, the tool 10 can be properly positioned with respect to the window 30 with an aid of the claw parts 12b. Thus, the strong adhesive tape 14 can be properly pasted on the window 30 at the predetermined position, and as a result, the film 24 can be properly pasted on the window 30 at the predetermined position.

In some cases, a release paper for protecting the surface 24b (a surface not having adhesiveness) is pasted on the surface 24b of the film 24. In this case, when adopting a method of directly pressing a squeegee on a film (strictly, a release paper for protection) to paste on a window (Hereinafter, this method will be referred to as a "prior art method".), moving the squeegee from an edge of the film for a purpose of suppressing the occurrence of air bubble underneath the film may cause the release paper for protection to peel off, resulting in making the film dirty or damaged. Thus, in the prior art method, moving the squeegee from the edge of the film have not been performed very often, which has been one factor of the easy occurrence of air bubble underneath the film. In contrast, in the film pasting method (the present embodiment method) according to the present embodiment, the squeegee 40 is indirectly pressed on the film 24 via the body 12 of the tool 10. Therefore, it is very less likely that the release paper for protection peels off even if the squeegee 40 is moved from the edge of the film 24. Accordingly, according to the present embodiment method, it can be suppressed that the film 24 is made dirty or damaged by the squeegee 40 as well as air bubble occurs underneath the film 24.

The film pasting tool and the film pasting method according to the present embodiment has been described. However, the present invention is not limited to the aforementioned embodiment and may adopt various modifications within a scope of the present invention.

For example, although in the above embodiment, the film 24 with the anti-fog property is pasted on the front window 30 of the vehicle with the tool 10, types of the film 24 and a target on which the film 24 is to be pasted are not limited thereto. For instance, the film 24 may be a protection film to protect a liquid crystal display and a target on which the film 24 is to be pasted may be the liquid crystal display.

In addition, although in the above embodiment, the tool 10 is used when exchanging a film which has been pasted on the window 30 for a new film 24, a configuration is not limited thereto. The tool 10 may be used when manufacturing the window 30. In a case of exchanging the film, a surface on which the film 24 is to be pasted is inclined since the work is done in the cabin (inside the vehicle), whereas in a case of manufacturing the window 30, the work can be done in a state where a surface on which the film 24 is to be pasted is made substantially horizontal. In this case, adhesive strength of the strong adhesive tape 14 required to fix the tool 10 to the window 30 may not be as high as the adhesive strength A4. Thus, depending on a situation where the tool 10 is used (for example, when manufacturing the window), the adhesive strength of the strong adhesive tape 14 against the window 30 may be equal to or smaller than the adhesive strength of the weak adhesive tape 20 against the film 24. In addition, a shape of each of the adhesive tapes 14, 20 is not limited to the elongated rectangular shape, but may be a square. Further, each of the adhesive tapes 14, 20 may include a plurality of adhesive parts.

Further, the tool 10 comprises the film 24 in the above embodiment, a configuration is not limited thereto, but a configuration where the film 24 is supplied separately from the tool 10 may be adopted. In this case, it is preferable that the base part 12a1 of the tool body 12 includes a positioning line (for example, the frame 28) for positioning the film 24.

Further, in the above embodiment, the length from the grip part 12a2 of the tool 10 to the weak adhesive tape 20 is shorter than the length from the grip part 12a2 to the strong adhesive tape 14, but a configuration is not limited thereto. For example, the former length may be the same as or longer than the latter length. The weak adhesive tape 20 can be properly spaced from the window 30 by changing a way of lifting the grip part 12a2 depending on a positional relationship between each of the adhesive tapes 14, 20 and the grip part 12a2.

Further, in the above embodiment, although the tool body 12 includes the grip part 12a2 and the claw parts 12b, a configuration where the tool body 12 does not include either one of them or both of them may be adopted. When the tool body 12 does not include the claw parts 12b, it is preferable that a guide is provided at the window 30, the guide serving as a positioning reference of when pasting the strong adhesive tape 14 on the window 30.

Further, in the above embodiment, the frame 28 for positioning the film 24 is printed on the surface 13a (that is, a surface on which the weak adhesive tape 20 on which the film 24 has been pasted is provided) of the base part 12a1 of the tool body 12. However, since the tool 10 is transparent, the frame 28 may be also printed on the surface 13b of the base part 12a1. It should be noted that the tool 10 may be untransparent. In this case, the frame 28 needs to be printed on the surface 13a, not on the surface 13b of the base part 12a1. In addition, the positioning line is not limited to the shape of the frame 28, but may be, for example, a line specifying only positions of corner parts of the film 24. Further, when the tool 10 comprises the film 24, the frame 28 may not be printed.

Further, although in the above embodiment, each of the adhesive tapes 14, 20 are pasted on the ceramic line 30a, a configuration is not limited thereto. These adhesive tapes 14, 20 may be pasted on a part of the window 30 where the ceramic line 30a is not provided/

Further, apparatuses placed in/on the bracket 32 are not limited to the camera sensor 34. For example, an information acquisition apparatus such as a radar sensor, a beacon, or the like may be placed.

The invention claimed is:

1. A film pasting tool configured to paste a front surface of a film on a member-to-be-pasted at a predetermined position, comprising:
a flexible tabular body, wherein said body is configured to bend without folding;
a first adhesive part, a front surface thereof being adhesive, and a back surface thereof provided on a first surface of said body; and
a second adhesive part, a front surface thereof being adhesive, and a back surface thereof provided on the first surface of said body, and located in a region other than a region where said first adhesive part is provided on the first surface of said body, wherein said second adhesive part is positioned on said first surface of said body so as to be located between said first adhesive part and a center of said first surface of said body, wherein,
said front surface of said second adhesive part has a lower adhesive strength than said front surface of said first adhesive part,
a back surface of said film is pastable on said front surface of said second adhesive part, and
when said back surface of said film is pasted on said front surface of said second adhesive part, said front surface of said first adhesive part is exposed in such a manner that said front surface of said first adhesive part is pastable directly on said member-to-be-pasted.

2. The film pasting tool according to claim 1 further comprising said film, wherein,
said back surface of said film has been pasted on said front surface of said second adhesive part.

3. The film pasting tool according to claim 2, wherein,
an outer contour of said film is smaller than an outer contour of said body.

4. The film pasting tool according to claim 1, wherein,
said body includes a grip part to be gripped by a worker when doing a pasting work, and said first adhesive part and said second adhesive part are not provided on said grip part.

5. The film pasting tool according to claim 4, wherein,
a length from said grip part to said second adhesive part is shorter than a length from said grip part to said first adhesive part.

6. The film pasting tool according to claim 1, wherein,
said film is larger than said second adhesive part, and
said first surface of said body includes at least one positioning line for positioning said film with respect to said body.

7. The film pasting tool according to claim 1, wherein,
said body is transparent,
said film is larger than said second adhesive part, and
a second surface of said body includes at least one positioning line for positioning said film with respect to said body.

8. The film pasting tool according to claim 1, wherein,
said front surface of said first adhesive part is pastable on said member-to-be-pasted and is peelable from said member-to-be-pasted after being pasted on said member-to-be-pasted, and
said film is peelable from said front surface of said second adhesive part after being pasted on said front surface of said second adhesive part.

9. A film pasting tool for pasting a front surface of a film on a member-to-be-pasted at a predetermined position, comprising:
a flexible tabular body that is flexible to an extent of bending without folding;
a first adhesive part, a front surface thereof being adhesive, provided on a first surface of said body; and
a second adhesive part, a front surface thereof being adhesive, provided on a part of a region other than a region where said first adhesive part is provided out of said first surface of said body, wherein,
a back surface of said film is pastable on said front surface of said second adhesive part, and
when said back surface of said film is pasted on said front surface of said second adhesive part, said front surface of said first adhesive part is exposed in such a manner that said front surface of said first adhesive part is pastable on said member-to-be-pasted, wherein,
said body includes at least one claw part configured to be engaged with a corresponding engaged part fixed on said member-to-be-pasted so that said film pasting tool is positioned with respect to said member-to-be-pasted.

10. A film pasting method using a film pasting tool according to claim 1, comprising:
a first adhesive part pasting step for pasting said front surface of said first adhesive part on said member-to-be-pasted at a predetermined first position;
a film preparing step for lifting, after said first adhesive part pasting step, said body in a direction departing from said member-to-be-pasted by holding a part of said body where said first adhesive part and said second adhesive part are not provided, said part being positioned at a second direction side of said body, said second direction being opposite to a first direction toward which said first adhesive part is positioned with respect to said second adhesive part, and putting said surface of said film into an adherable state;
a film pasting step for pressing, after said film preparing step, a squeegee on a part out of an other surface of said body, said part being positioned at said first direction side of a part corresponding to said film with said body held in such a manner that said surface of said film is not adhered to said member-to-be-pasted and moving said squeegee in said second direction, applying to said squeegee external force toward said member-to-be-pasted so as to paste, via said body, said surface of said film on said member-to-be-pasted at said predetermined position; and an adhesive part peeling step for peeling, after said film pasting step, said second adhesive part from said film and peeling said first adhesive part from said member-to-be-pasted by bending said body.

* * * * *